(12) United States Patent
Perera

(10) Patent No.: US 9,920,871 B2
(45) Date of Patent: Mar. 20, 2018

(54) BLAST PROTECTION DAMPER

(71) Applicant: Wozair Limited, Kent (GB)

(72) Inventor: Mudalige Anoj Menushka Mario Perera, Singapore (SG)

(73) Assignee: Wozair Limited (GB)

( * ) Notice: Subject to any disclaimer, the term of this patent is extended or adjusted under 35 U.S.C. 154(b) by 333 days.

(21) Appl. No.: 14/256,682

(22) Filed: Apr. 18, 2014

(65) Prior Publication Data

US 2014/0227959 A1 Aug. 14, 2014

Related U.S. Application Data

(63) Continuation of application No. 12/303,779, filed as application No. PCT/GB2007/050317 on Jun. 5, 2007, now abandoned.

(30) Foreign Application Priority Data

Jun. 7, 2006 (GB) .................................. 0611213.0

(51) Int. Cl.
*F16L 55/027* (2006.01)
*F16L 55/10* (2006.01)

(52) U.S. Cl.
CPC ......... *F16L 55/027* (2013.01); *F16L 55/1018* (2013.01); *F16L 55/1022* (2013.01); *Y10T 29/49826* (2015.01)

(58) Field of Classification Search
CPC .......... F16L 55/027; F41H 5/023; F41H 7/03; F41H 7/035
USPC ....................................................... 454/194
See application file for complete search history.

(56) References Cited

U.S. PATENT DOCUMENTS

| 1,865,677 | A |   | 7/1932 | Cheyney |
| 1,898,821 | A | * | 2/1933 | Ewald ........................... 454/369 |
| 2,679,467 | A | * | 5/1954 | Sherts ............... B32B 17/10036 |
|   |   |   |   | 156/101 |
| 3,075,448 | A |   | 1/1963 | Cohen |
| 3,347,338 | A |   | 10/1967 | Childress |

(Continued)

FOREIGN PATENT DOCUMENTS

| EP | 768505 | 6/1998 |
| JP | 2298619 | 12/1990 |
| NL | 7800233 | 1/1978 |

OTHER PUBLICATIONS

EPO Meeting Minutes for Application No. 07 733 738.4-1754 dated Oct. 29, 2015.

(Continued)

*Primary Examiner* — Steven B McAllister
*Assistant Examiner* — Samantha Miller
(74) *Attorney, Agent, or Firm* — Tumey L.L.P.

(57) ABSTRACT

A blast wave damper comprises a section of duct, with a multiplicity of rigid elements each extending across the duct. All the elements are parallel to each other, and they are arranged in an array consisting of a multiplicity of lines, each such line extending across the duct. The elements in one line are staggered relative to the elements in an adjacent line, and the gaps between successive elements within a line are no wider than the widths of the elements. There may be ten columns of tubular elements in a regular array. This may be combined with a louver mechanism arranged to shut if the pressure drop exceeds a threshold.

18 Claims, 2 Drawing Sheets

(56) References Cited

U.S. PATENT DOCUMENTS

| | | | |
|---|---|---|---|
| 3,378,100 A | | 4/1968 | Welty |
| 3,435,593 A | * | 4/1969 | Nordone ............... B01D 45/08 261/DIG. 9 |
| 3,454,128 A | | 7/1969 | Nopper |
| 3,477,203 A | * | 11/1969 | Wolfgang ............... F23J 15/00 95/228 |
| 3,651,788 A | * | 3/1972 | Chayes ..................... 122/4 R |
| 3,662,670 A | | 5/1972 | McCoy |
| 3,756,137 A | | 9/1973 | Scharres |
| 4,031,862 A | * | 6/1977 | Smith ..................... 122/421 |
| 4,059,231 A | * | 11/1977 | Neu ............................ 241/5 |
| 4,134,327 A | * | 1/1979 | Piesik ................. F41F 3/077 89/1.8 |
| 4,347,796 A | * | 9/1982 | King et al. ................. 109/49.5 |
| 4,360,075 A | * | 11/1982 | Blaser et al. ................. 181/250 |
| 4,440,698 A | * | 4/1984 | Bloomer ..................... 261/148 |
| 4,442,049 A | * | 4/1984 | Bloomer ..................... 261/148 |
| 4,452,124 A | * | 6/1984 | Morenus ............... F41F 3/045 89/1.703 |
| 4,671,189 A | * | 6/1987 | David ..................... E04H 9/10 109/15 |
| 4,686,804 A | * | 8/1987 | Smith ..................... E21D 11/00 109/1 S |
| 4,763,457 A | * | 8/1988 | Caspe ..................... E04B 1/98 52/167.1 |
| 4,908,978 A | * | 3/1990 | Zacharias ..................... 43/111 |
| 5,194,688 A | * | 3/1993 | Piesik ................. F41F 3/0413 89/1.8 |
| 5,318,606 A | * | 6/1994 | Geibel ................. B01D 46/24 55/309 |
| 5,394,786 A | * | 3/1995 | Gettle ................. E04B 1/82 102/303 |
| 5,495,894 A | * | 3/1996 | Spath ............................ 169/48 |
| 5,529,120 A | * | 6/1996 | Howard et al. ............... 165/166 |
| 5,675,104 A | * | 10/1997 | Schorr ..................... F21S 2/00 102/403 |
| 5,728,980 A | * | 3/1998 | Zarnick ..................... 181/224 |
| 5,840,100 A | * | 11/1998 | Arencibia, Jr. ................. 95/225 |
| 6,328,775 B1 | * | 12/2001 | Fuchs ................... A62B 23/04 109/1 S |
| 6,872,238 B1 | * | 3/2005 | Truce ............................ 95/29 |
| 7,527,663 B2 | * | 5/2009 | Riedo ................... A62B 13/00 109/1 S |
| 8,062,108 B2 | * | 11/2011 | Carlson et al. ............... 454/369 |
| 8,663,354 B2 | * | 3/2014 | Tindale ................. B01D 46/28 55/302 |
| 2001/0055947 A1 | * | 12/2001 | McCabe ..................... 454/369 |
| 2002/0175305 A1 | * | 11/2002 | McCabe et al. ........ 251/129.12 |
| 2003/0098200 A1 | * | 5/2003 | Clark ..................... 181/292 |
| 2004/0121722 A1 | * | 6/2004 | Heil et al. ..................... 454/369 |
| 2004/0148969 A1 | * | 8/2004 | Nikander ..................... 65/114 |
| 2004/0209566 A1 | * | 10/2004 | Caliendo et al. ............. 454/156 |
| 2004/0244382 A1 | * | 12/2004 | Hagen et al. ................... 60/775 |
| 2005/0056313 A1 | * | 3/2005 | Hagen et al. ..................... 137/3 |
| 2005/0232825 A1 | * | 10/2005 | Fowler et al. ................. 422/121 |
| 2006/0027419 A1 | * | 2/2006 | Ponomarev ............ B64D 37/32 181/210 |
| 2007/0107333 A1 | * | 5/2007 | Marsh et al. ................. 52/223.7 |
| 2008/0104960 A1 | * | 5/2008 | Lomax et al. ................... 60/653 |
| 2008/0121301 A1 | * | 5/2008 | Norris ............................ 138/39 |
| 2008/0138254 A1 | * | 6/2008 | Kurtz et al. ................. 422/121 |
| 2009/0031889 A1 | * | 2/2009 | Saul ..................... F41H 5/0492 89/36.02 |
| 2009/0180939 A1 | * | 7/2009 | Hagen et al. ................. 422/194 |
| 2009/0318072 A1 | | 12/2009 | Perera |

OTHER PUBLICATIONS

EPO Intent to Grant for Application No. 07 733 738.4-1754 dated Sep. 3, 2015.
EPO Approved Specifications for Application No. 07 733 738.4 dated Sep. 7, 2015.
"Blast Waves and How They Interact With Structures" IG Cullis J R Army Med Corps. Feb. 2001;147(1):16-26.
GB Search Report for Great Britain Patent Application No. GB0611213.0 dated Oct. 25, 2006.
PCT International Search Report for International Patent Application No. PCT/GB2007/050317 dated Aug. 16, 2007.

* cited by examiner

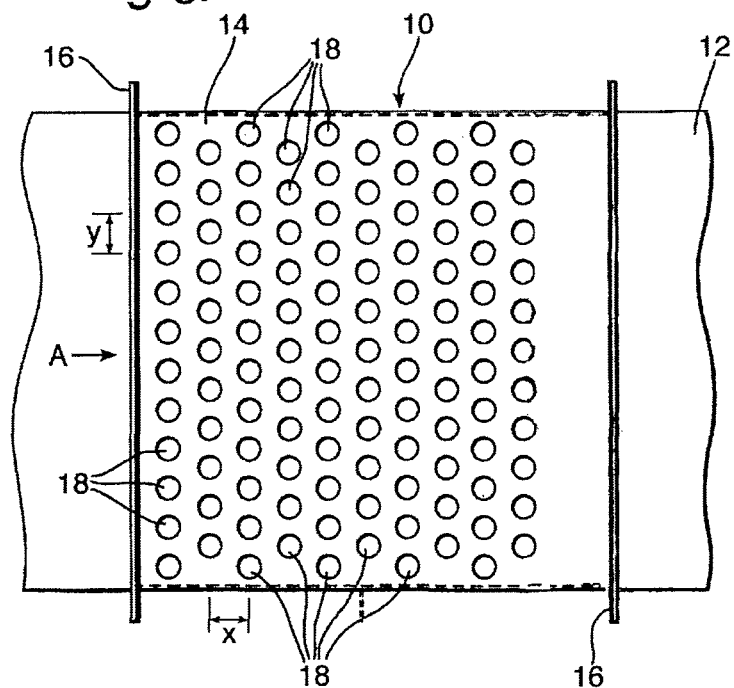

BLAST PROTECTION DAMPER

CROSS-REFERENCE TO RELATED APPLICATIONS

This application is a continuation of U.S. application Ser. No. 12/303,779 filed Dec. 8, 2008, which is herein incorporated by reference in its entirety.

STATEMENT REGARDING FEDERALLY SPONSORED RESEARCH OR DEVELOPMENT

Not applicable.

BACKGROUND OF THE INVENTION

Field of the Invention

The present disclosure is directed to a damper for mitigating blast waves in a duct.

Background of the Invention

It is known that ignition of a flammable mixture in a duct may create a blast wave which propagates along the duct. This is a particular issue in oil or gas production platforms, where such flammable mixtures may arise. If such a blast wave propagates into a region where there are people, this may cause significant injury, such as burst eardrums or damaged lungs. The provision of louvers to inhibit such blast waves is known, but louvers cannot shut sufficiently quickly to prevent passage of the pressure wave.

Consequently, there is a need for a blast protection damper to prevent passage of pressure waves. Additional needs include the rapid closure of dampers to prevent passage of pressure waves.

BRIEF SUMMARY OF SOME OF THE PREFERRED EMBODIMENTS

According to the present disclosure there is provided a blast protection damper comprising a section of duct, with a multiplicity of substantially rigid elements each extending across the duct, the elements all extending parallel to each other and being arranged in an array consisting of a multiplicity of lines of said elements, each such line extending across the duct, the elements in one line being staggered relative to the elements in an adjacent line, and the gaps between successive elements within a line being no wider than the widths of the elements.

The damper is particularly suitable for ducts through which, in normal operation, there is a forced gas flow. For example, this may be a flow of air for cooling or for ventilation, and typically the flow velocity in normal operation is in the range between 1 and 5 m/s. The damper in the embodiment is to be distinguished from sound attenuators, as the elements in the blast damper are rigid and are not of a sound-absorbing or attenuating material. Such rigid materials may be characterised as those for which the characteristic acoustic impedance (the product of sound velocity and density) is greater than $10 \times 10^6$ kg m$^{-2}$ s$^{-1}$, and more preferably greater than $30 \times 10^6$ kg m$^{-2}$ s$^{-1}$. They may for example be tubes of steel or titanium or a titanium alloy.

Preferably the lines are straight lines, and within each line the elements are equally spaced. For example the lines may be columns extending between the bottom and the top of the duct. Preferably there are at least eight such lines of elements in the array, more preferably at least ten such lines, but preferably no more than fifteen. It will be appreciated that the more lines of elements are provided, the greater the pressure drop during normal use of the duct, so there is a disadvantage in providing excessive numbers of lines of elements. On the other hand, the more lines of elements are provided, the more effective the damper is at mitigating blast waves. The preferred number of lines appears to be about ten.

Preferably, the elements are of cylindrical shape, and the elements are preferably tubular, as this reduces weight while providing adequate strength. In a preferred embodiment the elements are tubes of diameter about 60 mm, and are arranged at center-to-center spacing's of no more than 120 mm, for example 100 mm so that the elements of a single column occupy about 60% of the projected area.

Preferably, the blast protection damper also includes a louver which is arranged to shut if the pressure in the duct exceeds a threshold. This may for example incorporate a mechanical latch arranged to hold the louver blades in an open position, but the louver blades being oriented such that the flowing gases within the duct urge the blades towards the closed position. If the pressure in the duct exceeds a threshold indicative of the presence of a blast wave, then the mechanical latch releases the blades, which move into the closed position under the combined effect of gravity and the gas pressure.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 3 shows a side view of a modification to the protection damper of FIG. 1.

DETAILED DESCRIPTION OF THE PREFERRED EMBODIMENTS

Figure 1:
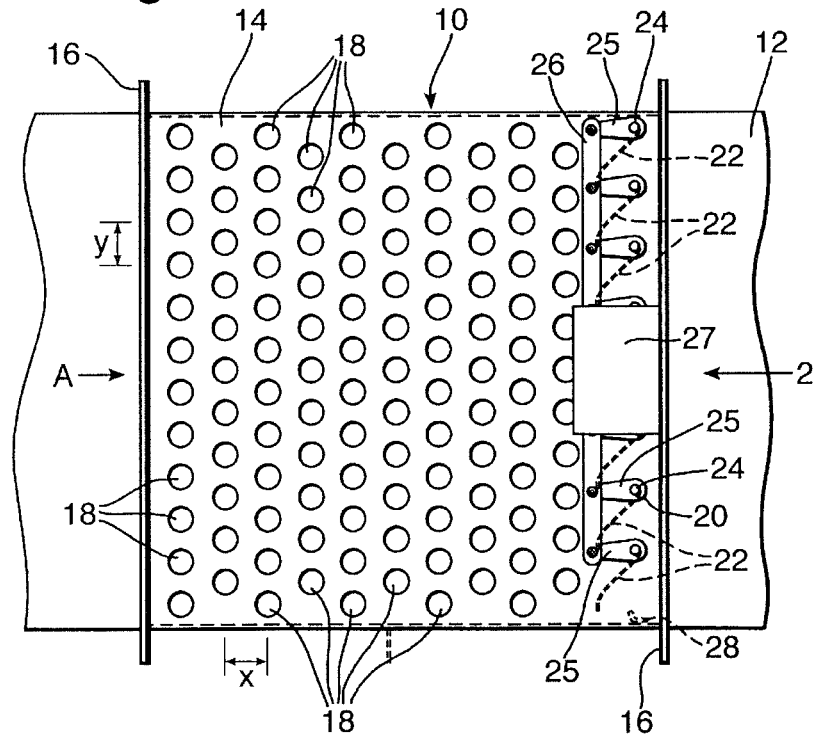
FIG. 1 illustrates a side elevation of a blast protection damper.
Figure 2:
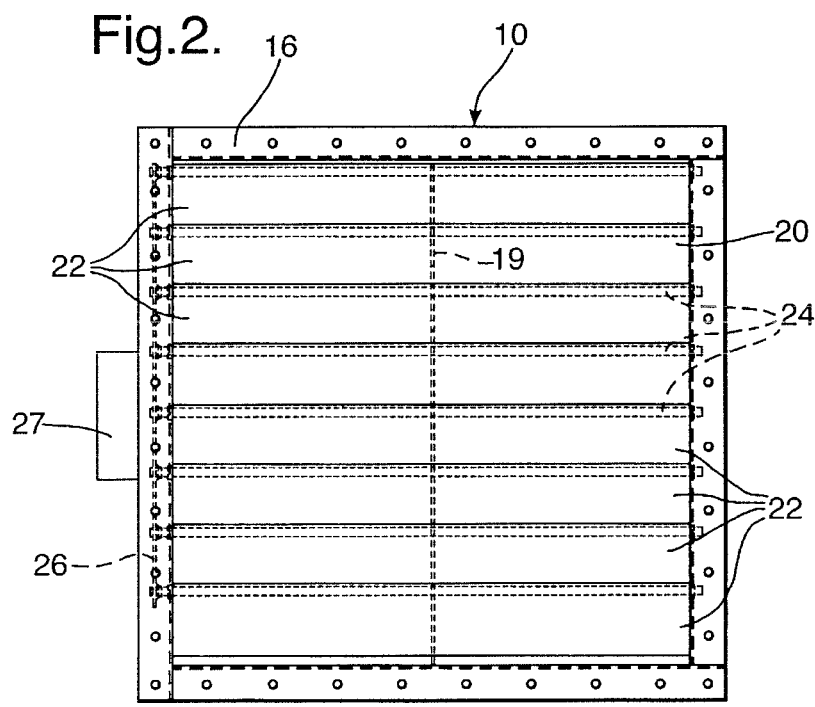
FIG. 2 illustrates an end of view of the damper of FIG. 1 in the direction of Arrow 2.

Referring to FIG. 1, a blast protection damper 10 forms part of a square duct 12 of width and height 1.2 m, through which the normal gas flow direction (and the potential blast wave direction) are indicated by Arrow A. The damper 10 consists of a section of square steel duct 14 which is of width and height 1.2 m, and of length 1.2 m, made of 5 mm-thick steel sheet, and connected to the duct 12 by means of flanges 16 at each end. There are 115 steel tubes 18 each of external diameter 60.3 mm and of wall thickness 3 mm which extend horizontally between opposite sides of the duct 14, being welded into corresponding holes in the sheets forming the duct wall, and being supported by corresponding holes in a vertical support plate 19 (shown in broken lines in FIG. 2) halfway across the duct 14. The tubes 18 are not indicated in FIG. 2, for clarity.

The tubes 18 are arranged in vertical columns, within each column the tubes 18 being spaced apart center-to-center (y) at 100 mm, and the longitudinal distance (x) between the centers of successive columns also being 100 mm. There are twelve tubes 18 in the first column, so that the gaps between adjacent tubes are about 40 mm, and similarly there are gaps of about 20 mm between the top and bottom tubes 18 and the top and bottom walls of the duct 14. The arrangement of the tubes in the other odd-numbered columns is identical to that in the first column. The even-numbered columns each have eleven tubes 18, and the tubes 18 are staggered relative to those in the odd-numbered columns, so that the centers of the tubes 18 are exactly midway in height between those of the tubes in the odd-numbered columns.

At the downstream end of the array of tubes 18 is a louver mechanism 20, consisting of eight louver blades 22 (shown in broken lines in FIG. 1) which in normal operation (as shown) are oriented at about 45°, each of length about 190 mm, whose upper edge is fixed to a 25 mm diameter steel rod 24. The steel rods 24 extend through bearings in the side walls of the duct 14, and are welded to arms 25 all of which are pivotally connected to a link bar 26. The link bar 26 is secured by a spring-operated latch mechanism (not shown) in a box 27, such that if the pressure forces acting on the blades 22 exceeds a threshold value, then the latch is released, so that the blades 22 rotate into a generally vertical position, under the effect of both the gas pressure and gravity. In the resulting, closed, position of the louver mechanism 20 the bottom edge of each blade 22 rests against the steel rod 24 of the next blade down, apart from the lowest blade 22 which rests against a stop 28.

In normal operation the damper 10 imposes a comparatively small pressure drop on the normal gas flow along the duct 12. In the event of a blast wave, the wave is scattered by the tubes 18 and dissipated, to a large extent. For example in the event of a blast wave with a pressure increase up to one atmosphere (100 kPa), for a blast duration of 200 msec, the damper restricts the over pressure to about 15.3 kPa at a location 2 m downstream of the damper 10. The pressure increase may be further limited by providing a plenum of a larger cross-sectional area than the duct 12 downstream of the damper 10.

It will be appreciated that the embodiment described above is given by way of example only. There may be some situations in which the louver mechanism 20 may be omitted, as shown in FIG. 3, depending on what magnitude of blast waves is expected.

It will also be appreciated that a damper of the disclosure may be sized to suit a particular duct. For example, for use with a smaller duct there may be a similar damper with the same number of columns of tubes, but all the dimensions being correspondingly smaller. Alternatively the tubes might be of the same size and spacing as described above, but the numbers of tubes in each column being reduced in accordance with the size of the duct. In either case the preferred number of columns is between eight and twelve, more preferably ten, if the damper is to be suitable for blast waves with a pressure increase of 100 kPa. If the damper is for use in situations in which the blast wave pressure will not exceed say 50 kPa, then the number of columns could be reduced; while if the damper is to contend with blast waves pressure up to say 150 kPa, then the number of columns would preferably be increased.

What is claimed is:

1. A blast protection damper for suppressing a blast wave in an air flow duct carrying a flow of air for cooling or ventilation, where the blast wave is a pressure wave which is such as to cause injury to people, the damper consisting only of a section of duct adapted to form part of the air flow duct, the section of duct having opposed walls, and a multiplicity of substantially rigid elements of steel, titanium, or titanium alloy, each extending across the section of duct and being fixed to the opposed walls at each end, the elements being of cylindrical shape and so providing only cylindrical surfaces to scatter blast-waves, the elements not comprising sound absorbing or attenuating material, and not being arranged for through-flow of any fluid, the elements all extending parallel to each other and being arranged in an array consisting of a multiplicity of lines of said elements, each such line extending across the section of duct, the elements in each such line being staggered relative to the elements in each adjacent line, and each gap between successive elements within each such line being no wider than the width of each element, such that, in the event of a blast wave in the section of duct, the damper restricts the overpressure downstream of the damper.

2. A damper as claimed in claim 1, wherein the lines are straight lines, and within each line the elements are equally spaced.

3. A damper as claimed in claim 1, wherein there are between eight and fifteen lines of elements in the array.

4. A damper as claimed in claim 3, wherein there are ten lines of elements in the array.

5. A damper as claimed in claim 1, wherein the elements within each such line occupy at least 50% of the projected area as viewed in a direction parallel to the flow direction along the duct.

6. A damper as claimed in claim 1, wherein the elements are of diameter about 60 mm, and in each line are arranged at center-to-center spacing of no more than 120 mm.

7. A blast protection damper comprising a damper as claimed in claim 1, wherein the section of duct also comprises a support plate at an intermediate position across the section of duct, so the elements extend through the support plate, the support plate supporting the rigid elements at an intermediate position along their length.

8. A blast protection structure for suppressing a blast wave in an air flow duct to carry an air flow for cooling or ventilation, where the blast wave is a pressure wave which is such as to cause injury to people, the blast protection structure comprising a damper consisting only of a section of duct adapted to form part of the air flow duct, the section of duct having opposed walls, with a multiplicity of substantially rigid elements of steel, titanium or titanium alloy, each having two ends, and extending across the duct, the ends being fixed to the opposed walls at each end, the elements being of cylindrical shape and so providing only cylindrical surfaces to scatter blast-waves, the elements not comprising sound absorbing or attenuating material, and not being arranged for through-flow of any fluid, the elements all extending parallel to each other and being arranged in an array consisting of a multiplicity of lines of said elements, each such line extending across the section of duct, the elements in each such line being staggered relative to the elements in each adjacent line, and each gap between successive elements within each such line being no wider than the width of each element, such that, in the event of a blast wave in the section of duct, the damper restricts the overpressure downstream of the damper, and the structure also comprising a louver which is arranged to shut if the pressure in the duct exceeds a threshold.

9. A blast protection structure as claimed in claim 8, wherein the louver is downstream of the damper, and comprises an array of louver blades which in normal operation are oriented at an acute angle to the gas flow direction, and are pivotally supported to be able to rotate into a closed position in which the louver blades are oriented across the duct, each louver blade resting against the adjacent louver blade, and the louver blades being connected to a latch, such that if the pressure forces acting on the louver blades exceeds a threshold value, the latch is released so that the blades rotate into the closed position under the effect of the gas pressure.

10. A blast protection damper as claimed in claim 8, wherein the air flow duct also comprises a plenum of a larger cross-sectional area than the section of duct downstream of the louver.

11. A method for providing a flow of air for cooling or ventilation along an air flow duct, where there is a risk that ignition of a flammable mixture may cause propagation of a blast wave along the air flow duct, where the blast wave is a pressure wave which is such as to cause injury to people, which method comprises:
  (A) installing in the air flow duct a blast protection damper consisting only of a section of the air flow duct, and a multiplicity of substantially rigid elements of steel, titanium or titanium alloy, each extending across the duct section and being fixed at each end, the elements being of cylindrical shape and so providing only cylindrical surfaces to scatter blast-waves, the elements not comprising sound absorbing or attenuating material, and not being arranged for through-flow of any fluid, the elements all extending parallel to each other and being arranged in an array consisting of a multiplicity of lines of said elements, each such line extending across the duct section, the elements in each such line being staggered relative to the elements in each adjacent line, and each gap between successive elements within each such line being no wider than the width of each element; and
  (B) causing air for cooling or for ventilation to flow along the air flow duct;
  whereby, in the event of a blast wave in the air flow duct, the damper restricts the overpressure downstream of the damper.

12. A method as claimed in claim 11, wherein the method also comprises:
  (A) installing a louver in the air flow duct adjacent to the duct section; and
  (B) arranging the louver to shut if the pressure in the duct exceeds a threshold.

13. A method as claimed in claim 12, wherein the louver is installed downstream of the damper, and comprises an array of louver blades which in normal operation are oriented at an acute angle to the gas flow direction, and are pivotally supported to be able to rotate into a closed position in which the louver blades are oriented across the duct, each louver blade resting against the adjacent louver blade, and the louver blades being connected to a latch, such that if the pressure forces acting on the louver blades exceeds a threshold value, the latch is released so that the blades rotate into the closed position under the effect of the gas pressure.

14. A method as claimed in claim 12, wherein the method also comprises installing in the air flow duct downstream of the louver, a plenum of a larger cross-sectional area than the section of duct.

15. A method as claimed in claim 11, wherein the elements are tubes of diameter about 60 mm, and in each line are arranged at center-to-center spacing of no more than 120 mm.

16. A method as claimed in claim 13, wherein there are ten lines of elements in the array.

17. A method as claimed in claim 13, wherein the elements within each such line occupy at least 50% of the projected area as viewed in a direction parallel to the flow direction along the air flow duct.

18. A method as claimed in claim 11, wherein the elements are tubular.

* * * * *